United States Patent [19]
Nicholl

[11] 3,738,309
[45] June 12, 1973

[54] COLLAPSIBLE WARNING DEVICE

[76] Inventor: Thomas H. Nicholl, 1204 W. 27th Street, Kansas City, Mo. 64108

[22] Filed: June 1, 1971

[21] Appl. No.: 148,324

[52] U.S. Cl. .......... 116/63 P, 40/125 G, 40/125 N, 40/129 R, 340/114 B
[51] Int. Cl. ........................................... E01f 13/00
[58] Field of Search .................... 40/125 G, 125 N, 40/129 R; 116/63 R, 63 P; 340/114, 119; 350/97, 99

[56] References Cited
UNITED STATES PATENTS

| | | | |
|---|---|---|---|
| 2,993,465 | 7/1961 | Ginsley et al. | 116/63 P |
| 1,297,820 | 3/1919 | Fitzgerald | 40/125 G |
| 3,520,235 | 7/1970 | Palazzolo et al. | 116/63 P X |
| 2,949,531 | 8/1960 | Lemelson | 340/114 B |
| 3,132,624 | 5/1964 | Shoemaker | 116/63 P |

FOREIGN PATENTS OR APPLICATIONS

| | | | |
|---|---|---|---|
| 603,348 | 3/1960 | Italy | 116/63 P |
| 1,209,466 | 1/1966 | Germany | 116/63 P |

Primary Examiner—John W. Caldwell
Assistant Examiner—Kenneth N. Leimer
Attorney—Fishburn, Gold and Litman

[57] ABSTRACT

A warning device for use as a traffic warning device has a base member and top member and a support member engaging and extending between the base member and the top member for holding the top member in spaced relation above the base member and eye-attracting material extending between the base member and the top member.

5 Claims, 6 Drawing Figures

PATENTED JUN 12 1973 3,738,309
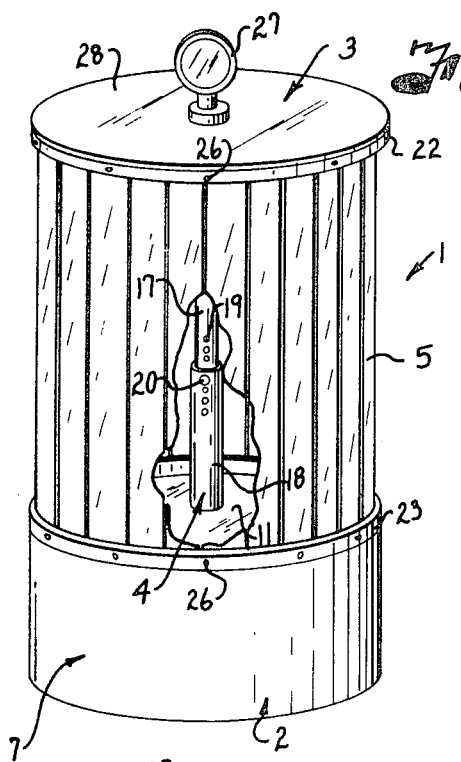
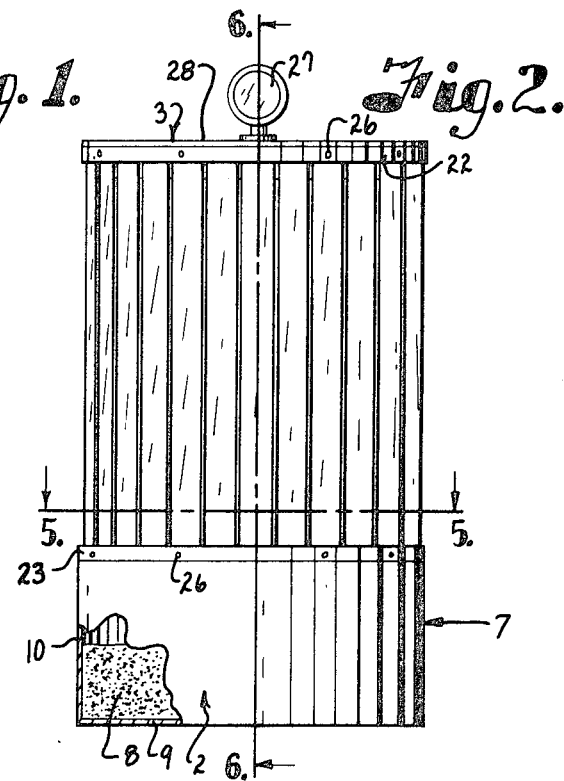
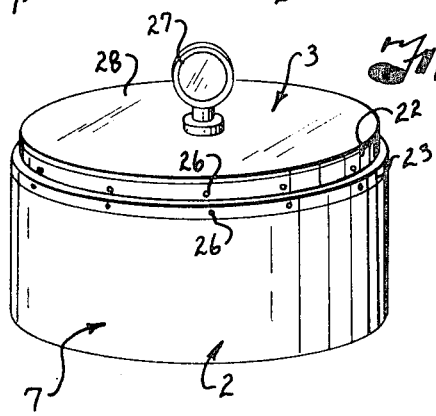
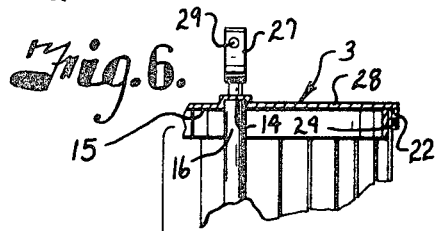
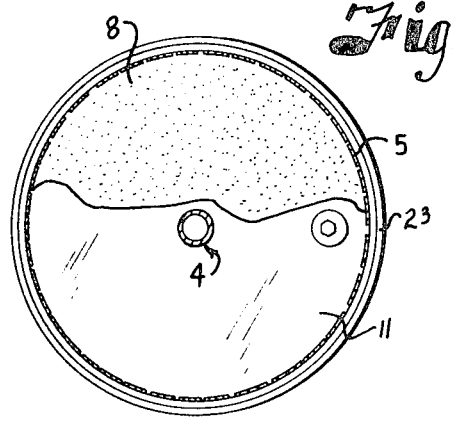
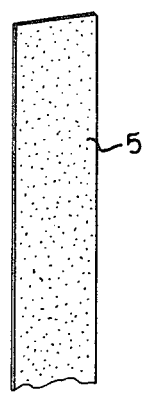
INVENTOR.
Thomas H. Nicholl
BY
Fishburn, Gold & Litman
ATTORNYS

COLLAPSIBLE WARNING DEVICE

The present invention relates to warning signal devices and more particularly to warning devices to be placed on or near highway, road, street consturction projects or other hazzards, to warn persons or drivers of motor vehicles to avoid designated areas.

The principal objects of the present invention are: to provide such a warning device for placing on or near dangerous areas, highway, road, and street construction projects or other hazzards for warning persons or drivers of motor vehicles under varying conditions of visibility; to provide such a warning device which is collapsible and can be easily and simply manipulated between collapsed and erected positions; to provide such a collapsible traffic warning device which is collapsible to a compact size for storage; to provide such a warning device with a base member and a top member and flexible eye-attracting structure extending therebetween; to provide such a warning device in which the eye-attracting structure is a plurality of strips offering low or minimum resistance to wind and which is visible in all directions; to provide such a warning device in which the strips reflect light and move in air currents for an animated effect; and to provide such a device which is economical to manufacture, simple to assemble, durable in use, convenient to use and store, and particularly well suited for the proposed use.

Other objects and advantages of this invention will become apparent from the following description taken in connection with the accompanying drawings wherein are set forth by way of illustration and example, certain embodiments of this invention.

The drawings constitute a part of this specification and include an exemplary embodiment illustrating various objects and features of the warning device of the present invention.

FIG. 1 is a perspective view of a warning device embodying features of the present invention.

FIG. 2 is a side elevational view of the warning device.

FIG. 3 is a perspective view of the warning device in a collapsed position.

FIG. 4 is an enlarged fragmentary perspective view of a strip of reflective material for use with the warning device.

FIG. 5 is a transverse sectional view taken on line 5—5, FIG. 2.

FIG. 6 is an enlarged fragmentary longitudinal sectional view taken on line 6—6, FIG. 2.

Referring more in detail to the drawings:

As required, detailed embodiments of the invention are diclosed herein, however, it is to be understood that the embodiments are merely exemplary of the invention which may be embodied in many forms that are different from those illustrative embodiments presented herein. Therefore, specific structural and functional details disclosed herein are not to be interpreted as limiting but merely as a basis for the claims actually defining the scope of this invention. In this regard, it is to be recognized that warning devices, in accordance herewith, may be embodied in various forms and furthermore that such structures may be variously collapsed or folded and supported in an in-use position. However, the disclosure hereof is presented only as representative basis for teaching one skilled in the art to variously employ the present invention in virtually any appropraite detailed structure.

In the illustrated embodiment, the reference numeral 1 generally designates a device particularly effective for use as a warning and signal device positioned on or adjacent dangerous areas, hazzards, or highway, road, or street construction projects and the like, and for placing near motor vehicles (not shown) which are stopped on or near streets and highways to warn drivers of motor vehicles to avoid the designated area or vehicle. The warning device 1 has header members adapted to be spaced, such as a base member 2 and a top member 3 and a member 4 engaging and extending between the base member 2 and the top member 3 for retaining same in spaced relation. Eye-attracting material 5 extends between the base member 2 and the top member 3. The material 5 is preferably fluorescent or reflective and may be in one or more planes or on curves including a cylindrical conformation.

It is preferred that the device 1 be collapsible and that the base member 2 have an open topped recess 6 and the top member 3 be of a size to be received therein for compact storage. The material 5 is flexible and may be positioned in the recess 6 with the top member 3.

The base member 2 is illustrated as a generally cylindrical member having an upwardly extending tubular portion 7 defining the open top recess 6. The base member 2 has a hollow portion forming a compartment 8 adapted to receive suitable ballast material, such as sand, rock, water, concrete blocks and the like, to increase the stability of the warning device and hold it in selected locations. The member 4 may be attached to one or the other of the base and top members and may be extensible and contractible. In the structure illustrated, the member 4 is a rigid post preferably tubular and has ends engaged with the base member 2 and top member 3 when in erected position, said member 4 being removable to collapse the warning device 1.

The base member 2 is illustrated as having a bottom wall 9, side walls 10, and a partition 11, spaced from the bottom wall 9 to define the compartment 8. The partition 11 has a central recess 12 or depressed portion to receive and hold the lower end 13 of the support member 4.

The top member 3 is illustrated as a generally cylindrical member sized and shaped to be received within the open topped recess 6 of the base member 2. In the illustrated embodiment, the top member 3 has an upward extending recess 14 in a lower surface 15 thereof, said recess 14 is aligned with the recess 17 and receives the upper end 16 of the member 4 when the warning device is erected. The standard or support member 4 is removable from the pair of recesses 12 and 14 to permit the top member 3 to be moved into the open topped recess 6 for storage therein.

The standard or member 4 preferably is adjustable in length to selectively vary the spacing between the base member 2 and the top member 3 and accommodate different height signal material 5. In the illustrated structure, the member 4 is formed of telescoping upper and lower portions 17 and 18 respectively, each having a plurality of apertures 13 longitudinally spaced therealong which may be selectively aligned to receive suitable fastening means, such as one or more pins or bolts 20 having keepers 21 to secure the member 4 in a selected length.

The signal material 5 extends between the base member 2 and the top member 3 and is preferably positioned and secured around the periphery of the base member 2 and the top member 3. In the illustrated structure, the signal material 5 comprises a sheet with a plurality of spaced cuts forming elongate strips in side-by-side relation. The signal material may be separate strips wherein a plurality of flexible strips are circumferentially spaced around the base member 2 and the top member 3, whereby the flexible strips may be collapsed or removed for storage within the open topped recess 6 of the base member 2, such as under the top member 3 when the standard 4 is removed. The flexible strips may be removably mounted on the base member 2 and the top member 3 in any suitable manner, such as having respective end portions thereof held in clamped engagement between the base member 2 and top member 3 and clamp members ring portions 22 and 23 mounted in edge recesses 24 and 25 in facing surfaces of the base member 2 and the top member 3 respectively. The ring portions 22 and 23 are suitably secured in position, as by a plurality of circumferentially spaced fastening members, such as bolts or screws 26.

The flexible strips of reflective material 5 may be formed of any suitable attention-attracting material, such as metal, foil, fluorescent strips, reflective tape, and the like, which will reflect sunlight and motor vehicle lights or other light, for increased visibility at all times. The flexible strips of reflective material 5 are also moved by air currents or vibrations and the movement thereof provides animation which increases the likelihood of observation thereof by approaching persons. Also, the strips may be transversely curved and otherwise shaped for diversion of light therefrom.

When the warning device 1 is to be positioned adjacent particularly high-risk areas, roads, or adjacent construction projects, and the like, it is desirable to substantially increase the attention-attracting ability of the warning device 1, therefore, a signal device 27 is mounted on the top member 3 and extends upward from the upper surface 28 thereof. The signal device 27 is selectively operative to produce intermittent light signals independent of the eye or attention-attracting ability of the material 5. The signal device 27 is preferably powered by a suitable battery (not shown) contained therein.

In using a warning device, constructed as illustrated and described, the base member 2 is positioned in the desired location and the top member 3 is removed from the open topped recess 6. A lower end 13 of the removable member or standard 4 is mounted in the recess 12 of the base member 2 and extends upwardly therefrom to have the recess 14 of the top member 3 placed over the upper end 16 of the removable member or standard 4 to thereby support the top member 3. The removable member or standard 4 is then adjusted in length and the fastening members are secured in position to maintain the top member 3 in the selected spaced position. Suitable ballast material, such as sand, gravel, water, concrete blocks, and the like, may be placed in the compartment 8 of the base member 2 to increase the stability of the warning device 1 when assembled. The strips of reflective material 5 are held in place extending between the base member 2 and the top member 3, as by mounting the opposite ends thereof in the edge recesses 24 and 25 of the base member 2 and top member 3 and by mounting the ring portions 22 and 23 therein to clamp respective end portions of the strips 5 in position. When the signal device 27 is mounted on the upper surface 28 of the top member 3, same is activated as by a suitable switch 29 mounted thereon, after the warning device 1 is completely assembled and positioned in the desired location.

It is to be understood that while I have illustrated and described certain forms of my invention, it is not to be limited to these specific forms or arrangement of parts herein described and shown.

What I claim and desire to secure by Letters Patent is:

1. A warning device comprising:
   a. first and second header members;
   b. said first header member is being a base member and having an open top recess therein;
   c. said second header member being a top member sized to be received within said base member for storage therein;
   d. flexible lengths of eye attracting material extending between said first and second header members;
   e. said eye attracting material being reflective;
   f. means securing said eye attracting material to the first and second header members;
   g. standard means engaging said first and second header members and extending therebetween for retaining same in spaced relation and said flexible lengths extended;
   h. said base member having a ballast compartment and a wall member with an upwardly opening depressed portion therein;
   i. said top member having an upwardly extending recess in the lower surface thereof; and
   j. said standard means has ends engaged in the respective depressed portion in the base member and upwardly extending recess in said top member.

2. A warning device as set forth in claim 1 wherein:
   a. said standard means is removable from said depressed portion in said base member and upwardly extending recess in said top member; and
   b. said standard means is adjustable in length to vary the spacing between said base member and said top member.

3. A warning device as set forth in claim 2 wherein:
   a. said reflective eye attracting material collapses for storage in the base member under the top member when the standard means is removed to release the top member and base member.

4. A warning device as set forth in claim 3 wherein:
   a. said base member is a generally cylindrical member having a tubular portion defining said open top recess;
   b. said top member is a generally cylindrical member; and
   c. said reflective material has a plurality of flexible strips, the reflective material is extended into a generally cylindrical form when the base member and top member are retained in spaced erected position.

5. A warning device as set forth in claim 4 wherein the eye attracting material securing means include:
   a. clamp members extending circumferentially of the base member and top member with end portions of the eye-attracting material therebetween; and
   b. fastening means securing the clamp members to the base member and the top member and clamping the eye-attracting members thereto.

* * * * *